United States Patent [19]

Tsuji

[11] Patent Number: 5,011,128
[45] Date of Patent: Apr. 30, 1991

[54] APPARATUS FOR DETECTING THE THICKNESS OF SHEETS

[75] Inventor: Keiji Tsuji, Tokyo, Japan

[73] Assignee: Laurel Bank Machines Co., Ltd., Tokyo, Japan

[21] Appl. No.: 342,797

[22] Filed: Apr. 25, 1989

[30] Foreign Application Priority Data

Apr. 26, 1988 [JP] Japan ................. 63-102905

[51] Int. Cl.$^5$ ............................... B65H 7/12
[52] U.S. Cl. .................... 271/263; 271/259; 271/265
[58] Field of Search ......... 271/262, 263, 265, 259; 324/229, 230

[56] References Cited

U.S. PATENT DOCUMENTS

| 4,121,716 | 10/1978 | Luperti et al. | 271/263 |
| 4,700,368 | 10/1987 | Munn et al. | 271/263 |
| 4,729,556 | 3/1988 | Fujii et al. | 271/263 |

FOREIGN PATENT DOCUMENTS 59-60592 4/1984 Japan.
2205649 12/1988 United Kingdom.

Primary Examiner—H. Grant Skaggs
Attorney, Agent, or Firm—Fleit, Jacobson, Cohn, Price, Holman & Stern

[57] ABSTRACT

An apparatus for detecting the thickness of sheets by detecting displacement of one of a pair of rollers disposed so as to face each other across a transporting path of the sheets, the pair of the rollers being driven by a driving motor and including a reference roller rotatable about a fixed shaft and a movable roller abuttable against the reference roller and rotatably mounted on a movable shaft displaceable with respect to the reference roller, the apparatus further including a timing signal generator for generating timing signals synchronized with rotation of the reference roller and the movable roller, a displacement detector for detecting an amount of displacement of the movable roller by detecting an amount of displacement of the movable shaft in synchronism with the timing signals, a sheet detector for detecting whether or not the sheets are present at a portion where the reference roller and the movable roller face each other, a sheet thickness calculator for calculating the thickness of the sheet by deducting, in accordance with the timing signals, the amount of displacement of the movable roller detected by the displacement detector when the sheet detector does not detect any sheet at the portion where the reference roller and the movable roller face each other from the amount of displacement of the movable roller detected by the displacement detector when the sheet detector detects the sheet at the portion where the reference roller and the movable roller face each other. According to this apparatus for detecting the thickness of sheets, it is possible to detect the thickness of sheets with high accuracy and this apparatus is particularly suitable for detecting double feed of bills and bills counterfeited by use of adhesive tape.

22 Claims, 3 Drawing Sheets

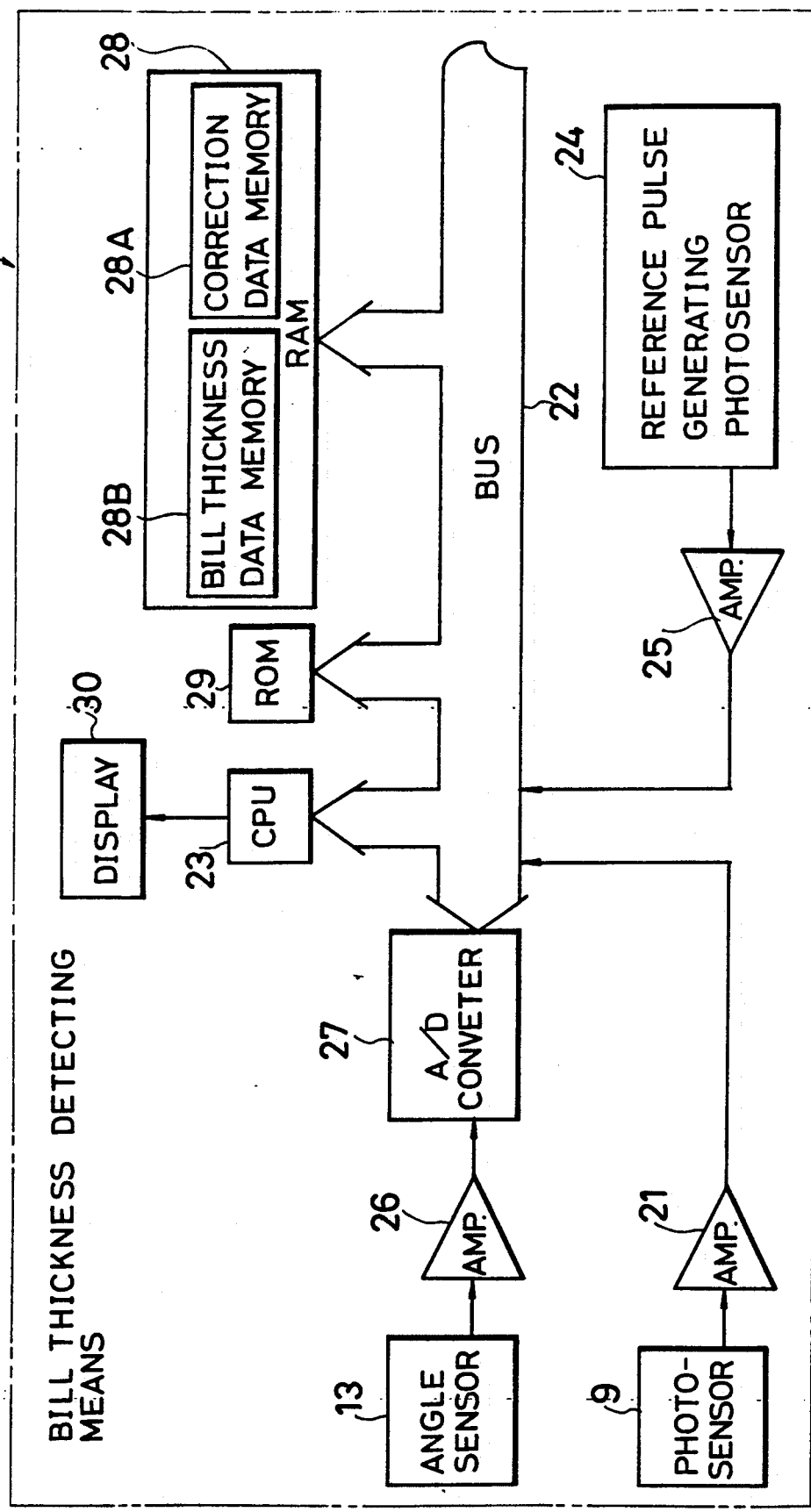

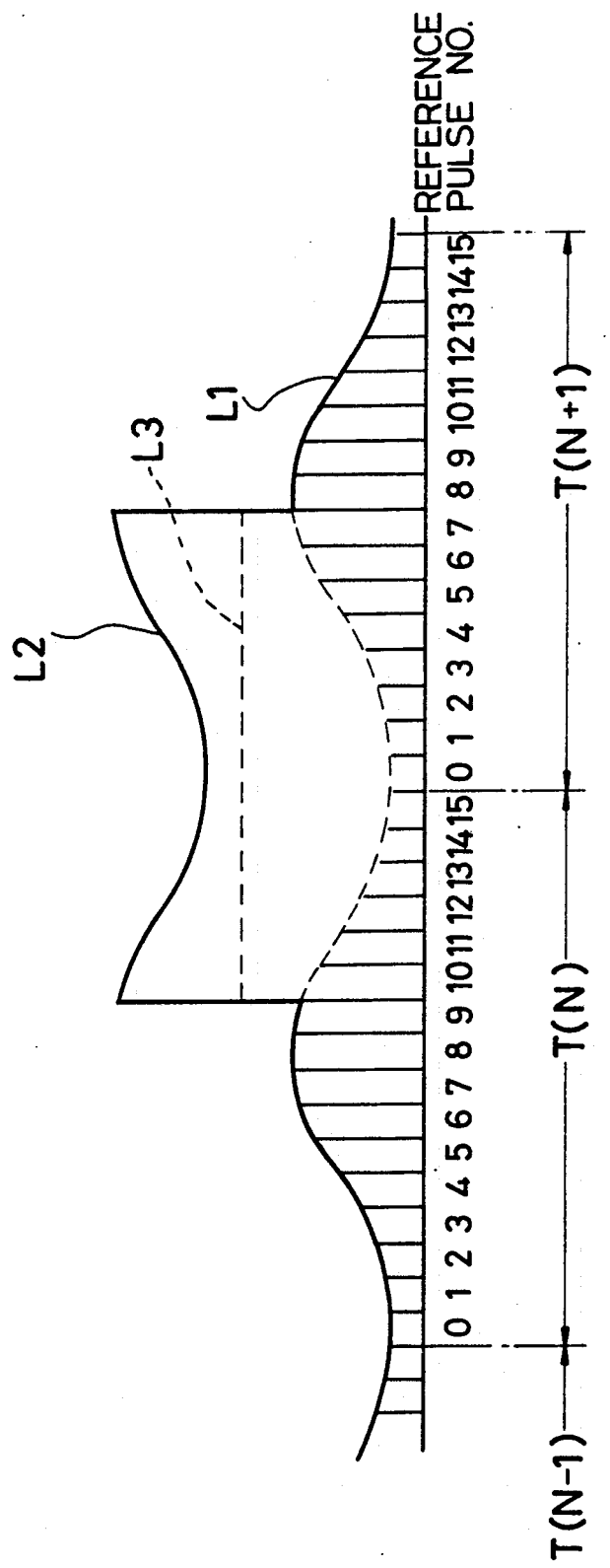

APPARATUS FOR DETECTING THE THICKNESS OF SHEETS

CROSS REFERENCE OF RELATED APPLICATIONS

The present invention relates generally to the subject matter of the following prior U.S. Pat. application: Ser. No. 826,261, filed on Feb. 5, 1986, entitled "Apparatus for Detecting the Thickness of Bank Note", now matured to U.S. Pat. No. 4,729,556.

BACKGROUND OF THE INVENTION

The present invention relates to an apparatus for detecting the thickness of sheets, and more particularly to such an apparatus suitable for detecting double feed of bills and bills counterfeited by use of adhesive tape.

DESCRIPTION OF THE PRIOR ART

In bill processing machines such as bill counting machines, detection of the thickness of bills has been conducted for detecting double feed of bills and for detecting bills counterfeited by use of adhesive tape by cutting a bill into slender strips and joining some of them by using adhesive tape.

Unexamined Japanese Patent Publication No. 59 (1984)-60592 proposes an apparatus for detecting the thickness of bills suitable for detecting double feed of bills and counterfeit bills to which adhisive tape is adhered in a bill processing machine such as a bill counting machine.

In this apparatus, a plurality of transporting belts are carried on a plurality of supporting rollers to form two pairs of belts, the belts forming each pair of belts being partially in contact with each other and sheets whose thickness is to be detected are held between these two pairs of belts at the upper and lower edges thereof and transported. A reference roller is mounted on a supporting shaft rotatably supporting one of the supporting rollers so as not to be rotatable about the supporting shaft, and, further, a lever is mounted on another shaft in such a manner that it is swingable about the shaft and is biased so as to be in contact with the surface of the reference roller. The detection of the thickness of sheets is carried out by converting the swing of the lever about the shaft in the direction opposite to the reference roller generated when the sheets pass between the reference roller and the lever to an amount of change in the rotation angle of a shaft of a potentiometer.

However, in this apparatus, since the reference roller is mounted on the supporting shaft so as not to be rotatable, sheets often jam between the reference roller and the lever by frictional force between the reference roller and the sheets.

Although it may be considered that such a problem can be solved by making the reference roller rotatable, in the case where the reference roller is made rotatable, it is indispensable for detecting the thickness of the sheets with sufficiently high accuracy to manufacture the reference roller with high accuracy so that roundness thereof is sufficiently high and to mount the reference roller on the supporting shaft without any eccentricity.

However, manufacture of the reference roller with the high accuracy required for it to have sufficiently high roundness inevitably results in increase cost, and it is almost impossible to mount the reference roller on the supporting shaft without any eccentricity. Accordingly, in the case where such an apparatus is used for detecting double feed of bills and/or bills counterfeited by use of adhesive tape, it is impossible to detect the thickness of bills, which is usually less than 100 micron, with high accuracy and to detect double feed of bills and/or bills counterfeited by use of adhesive tape without fail.

SUMMARY OF THE INVENTION

It is, therefore, an object of the present invention to provide a sheet thickness detecting apparatus capable of detecting the thickness of sheets with high accuracy.

Another object of the present invention is to provide a sheet thickness detecting apparatus for detecting the thickness of sheets by detecting displacement of one of a pair of rollers disposed so as to face each other across a transporting path of the sheets, said pair of rollers being driven by driving means, said sheet thickness detecting apparatus being capable of preventing the sheets from jamming and detecting the thickness of the sheets with high accuracy.

A further object of the present invention is to provide a sheet thickness detecting apparatus for detecting the thickness of sheets by detecting displacement of one of a pair of rollers disposed so as to face each other across a transporting path of the sheets, said pair of rollers being driven by driving means, said sheet thickness detecting apparatus being capable of detecting the thickness of the sheets with high accuracy even in cases where the rollers are not manufactured nor mounted on the apparatus with high accuracy.

According to the present invention, the above and other objects can be accomplished by an apparatus for detecting the thickness of sheets by detecting displacement of one of a pair of rollers disposed so as to face each other across a transporting path of the sheets, said pair of rollers being driven by driving means, said pair of the rollers essentially consisting of a reference roller rotatable about a fixed shaft and a movable roller abuttable against said reference roller and mounted on a movable shaft displaceable with respect to said reference roller, said apparatus comprising timing signal generating means for generating timing signals synchronized with the rotation of said reference roller and said movable roller, displacement detecting means for detecting an amount of displacement of said movable roller by detecting an amount of displacement of said movable shaft in synchronism with said timing signals, sheet detecting means for detecting whether or not the sheets are present at a portion where said reference roller and said movable roller face each other, sheet thickness calculating means for calculating the thickness of the sheet by deducting, in accordance with the timing signals, the amount of displacement of said movable roller detected by said displacement detecting means when said sheet detecting means does not detect any sheet at the portion where said reference roller and said movable roller face each other from the amount of displacement of said movable roller detected by said displacement detecting means when said sheet detecting means detect the sheet at the portion where said reference roller and said movable roller face each other.

The above and other objects and features of the present invention will become apparent from the following description made with reference to accompanying drawings.

BRIEF DESCRIPTION OF THE DRAWINGS

FIG. 2 is a block diagram showing a bill thickness detecting means used in a bill thickness detecting apparatus which is an embodiment of the present invention.

FIG. 3 is a graph showing data representing the displacement of a movable roller detected by the bill thickness detecting means shown in FIG. 2.

DESCRIPTION OF THE PREFERRED EMBODIMENTS

Figure 1:
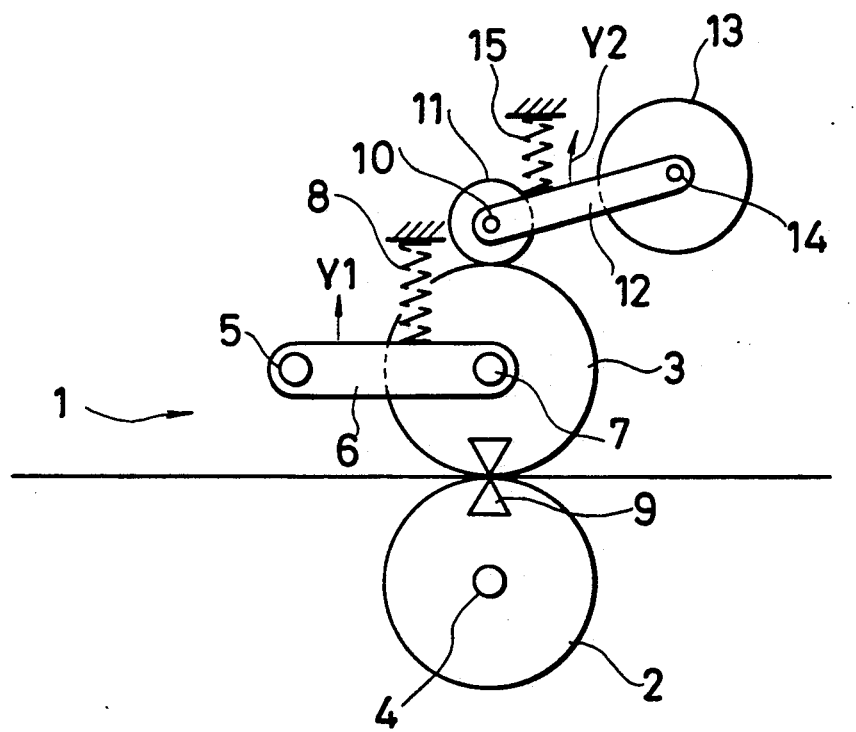
FIG. 1 is a schematic drawing showing a top plan view of a bill thickness detecting apparatus which is an embodiment of the present invention.

FIG. 1 shows an apparatus for detecting the thickness of bills which is an embodiment of the present invention.

Referring to FIG. 1, in the apparatus for detecting the thickness of bills, a reference roller 2 and a movable roller 3 having the same diameter as that of the reference roller 2 are disposed so as to face each other across a bill transporting path along which bills are transported by a plurality of transporting rollers (not shown) and a plurality of belts (not shown) driven by a driving means (not shown) in such a manner that the surface of the bill is substantially vertical, the reference roller 2 being mounted on a fixed reference shaft 4 so as to be rotatable about the fixed reference shaft 4 by the driving means in synchronism with the transporting rate of the bills, the movable roller being mounted on a movable shaft 7 so as to be rotatable about the movable shaft 7 by the driving means in synchronism with the transporting rate of the bills, said movable shaft 7 being connected to one end of a connecting arm 6 which is swingably mounted on a fixed shaft 5 at the other end. The connecting arm 6 is biased by a compression spring 8 toward the reference roller 2, that is, in the direction opposite to that indicated by an arrow Y1, whereby the movable roller 3 abuts against the surface of the reference roller 2 in the case where no bill exists between the reference roller 2 and the movable roller 3, while in the case where a bill is fed along the bill transporting path 1 to the portion where the reference roller 2 and the movable roller 3 face each other, the movable roller 3 is pushed away by the bill with the result that the connecting arm 6 and the movable roller 3 are swung about the fixed shaft 5 in the direction indicated by the arrow Y1.

A photosensor 9 is provided at the portion where the reference roller 2 and the movable roller 3 face each other for detecting whether or not a bill is present there.

There is disposed at the opposite side to the reference roller 2 with respect to the movable roller 3 an auxiliary roller 11 having a small diameter and rotatable about a shaft 10 to which a detecting arm 12 is secured at one end thereof, the other end of the detecting arm 12 being mounted on a rotatable shaft 14 of an angle sensor 13. A compression spring 15 is secured to the detecting arm 12 so as to bias the detecting arm 12 toward the movable roller 3, that is, in the opposite direction to that indicated by an arrow Y2, whereby the auxiliary roller 11 always abuts against the surface of the movable roller 3.

Accordingly, when a bill is fed to the portion where the reference roller 2 and the movable roller 3 face each other, the connecting arm 6 and the movable roller 3 are swung about the fixed shaft 5 in the direction indicated by the arrow Y1, and, as a result, the auxiliary roller 11 and the detecting arm 12 are swung in the direction indicated by the arrow Y2 in synchronism with the swing of the movable roller 3 and the connecting arm 6, whereby the rotatable shaft 14 of the angle sensor 13 is rotated. So, the amount of displacement of the movable roller 3, that is, the movable shaft 7 can be detected by detecting the rotation angle of the rotatable shaft 14 of the angle sensor 13 and, therefore, the thickness of the bill can be detected.

FIG. 2 shows a block diagram of a bill thickness detecting means 20 used in the apparatus for detecting the thickness of bills which is an embodiment of the present invention.

Referring to FIG. 2, bill detection signals which are output from the photosensor 9 when the photosensor 9 detects at least one bill at the portion where the reference roller 2 and the movable roller 3 face each other are amplified by an amplifier 21 and input to a CPU 23 via a bus 22. There is provided a reference pulse generating photosensor 24 for generating reference pulses, as timing signals, synchronized with the bill transporting rate, that is, the rotation of the reference roller 2 and the movable roller 3, by detecting gear teeth of the driving means for driving the transporting rollers for transporting bills, the reference roller 2 and the movable roller 3, and the reference pulses output from the reference pulse generating photosensor 24 are amplified by an amplifier 25 and input to the CPU 23 via the bus 22. Rotation angle signals output from the angle sensor 13 are amplified by an amplifier 26 and converted to digital signals by an A/D converter 27 to be fed to the bus 22. The digital signals fed to the bus 22 are read by the CPU 23 as displacement data representing the displacement of the movable roller 3 in synchronism with the reference pulses output from the reference pulse generating photosensor 24.

In the case where no bill detection signals are output by the photosensor 9 and the CPU 23 judges that no bill is present at the portion where the reference roller 2 and the movable roller 3 face each other, the CPU 23 outputs the displacement data read from the angle sensor 13 to a correction data memory 28A of a RAM 28 as correction data, wherein the correction data are stored. These correction data represent the amount of displacement of the movable roller 3 generated by the rotation of the reference roller 2 and the movable roller 3 which are in contact with each other when no bill is present at the portion where the reference roller 2 and the movable roller 3 face each other and correspond to the amount of displacement of the movable roller 3 caused by at least one of the reference roller 2 and the movable roller 3 being not manufactured so as to have sufficient roundness and/or at least one of the reference roller 2 and the movable roller 3 being mounted on the shaft 4 and/or 7 with some eccentricity.

On the other hand, in the case where the bill detection signals are output from the photosensor 9 and the CPU 23 judges that a bill is present at the portion where the reference roller 2 and the movable roller 3 face each other, the CPU 23 deducts the correction data stored in the correction data memory 28A of the RAM 28 from the displacement data read from the angle sensor 13 and outputs the thus obtained data to a bill thickness data memory 28B as bill thickness data, wherein they are stored. The displacement data read by the CPU 23 when the bill is present at the portion where the reference roller 2 and the movable roller face each other represent the amount of displacement of the movable roller 3 caused by the movable roller 3 being pushed away by the bill passing between the reference roller 2 and the movable roller 3 and that caused by at least one of the reference roller 2 and the movable roller 3 being not manufactured so as to have sufficient roundness and/or at least one of the reference roller 2 and the movable roller 3 being mounted on the shaft 4 and/or 7 with some eccentricity. Therefore, the bill thickness data obtained by deducting the correction data stored in the correction data memory 28A of the RAM 28 from the displacement data read from the angle sensor 13 and stored in a bill thickness data memory 28B are free from errors caused by the manufacturing errors and/or mounting errors of the reference roller 2 and the movable roller 3.

In FIG. 2, the reference numeral 29 designates a ROM storing a control program and various reference values, and the reference numeral 30 designates a display for informing an operator when the bill thickness detecting means 20 detects double feed of bills and/or bills counterfeited by use of adhesive tape.

FIG. 3 is a graph showing an example of the displacement data of the movable roller 3 read by the CPU 23.

In FIG. 3, the curve L1 shows the displacement data of the movable roller 3 read by the CPU 23 when no bill is present at the portion where the reference roller 2 and the movable roller 3 face each other, and the curve L2 shows the displacement data of the movable roller 3 read by the CPU 23 when at least one bill exists at the portion where the reference roller 2 and the movable roller 3 face each other. In this example, the reference pulse generating photosensor 24 is set to output sixteen reference pulses per rotation of the reference roller 2 and the movable roller 3.

As shown by way of example in FIG. 3, during the period between the reference pulse Nos. 0 to 9 in a rotation cycle T(N) of the reference roller 2 and the movable roller 3, the photosensor 9 does not detect any bill at the portion where the reference roller 2 and the movable roller 3 face each other and does not output bill detection signals. So, since no bill is present at the portion, the CPU 23 reads only the displacement data L1 of the movable roller 3 caused by the manufacturing errors and/or the mounting errors of at least one of the reference roller 2 and the movable roller 3. The CPU 23 outputs the thus read displacement data L1 as the correction data to the correction data memory 28A of the RAM 28 where the correction data are stored.

When the reference pulse No. 10 is output by the reference pulse generating photosensor 24 in the rotation cycle T(N) of the reference roller 2 and the movable roller 3, the photosensor 9 detects a bill at the portion where the reference roller 2 and the movable roller 3 face each other and starts to output the bill detection signals. The CPU 23 thus receives the displacement data L2 of the movable roller 3, which are equal to the sum of the amount of displacement of the movable roller 3 caused by the manufacturing errors and/or the mounting errors of at least one of the reference roller 2 and the movable roller 3 and that corresponding to the thickness of the bill. Then the CPU 23 reads out the correction data which were read and stored in the correction data memory 28A when the reference pulse No. 10 was output by the reference pulse generating photosensor 24 in the previous rotation cycle T(N−1) of the reference roller 2 and the movable roller 3, deducts the thus read-out correction data from the displacement data L2 read when the reference pulse No. 10 in the present cycle T(N) was output, and outputs the thus obtained data (L2−L1) as bill thickness data to the bill thickness data memory 28B of the RAM 28 where the bill thickness data are stored.

As shown in FIG. 3, since during a period up to the time the reference pulse No. 7 is output in the next rotation cycle T(N+1) of the reference roller 2 and the movable roller 3, at least one bill is present at the portion where the reference roller 2 and the movable roller 3 face each other and the photosensor 9 outputs the bill detection signal to the CPU 23, the CPU 23 reads the displacement data L2 of the movable roller 3, this displacement data L2 being equal to the sum of the amount of displacement of the movable roller 3 caused by the manufacturing errors and/or the mounting errors of at least one of the reference roller 2 and the movable roller 3 and that corresponding to the thickness of the bill. Therefore, at each time the CPU 23 reads the displacement data of the movable roller 3, the CPU 23 reads out the correction data which were read and stored in the correction data memory 28A when the reference pulse having the same number was output by the reference pulse generating photosensor 24 in the previous rotation cycle T(N−1) or T(N) of the reference roller 2 and the movable roller 3, deducts the thus read-out correction data from the displacement data L2, and outputs the thus obtained data (L2−L1) as bill thickness data to the bill thickness data memory 28B of the RAM 28 where the bill thickness data are stored. The curve L3 shows the bill thickness data calculated and stored in the bill thickness data memory 28B of the RAM 28 in the above described manner.

When the reference pulse No. 8 is output from the reference pulse generating photosensor 24 in the rotation cycle T(N+1) of the reference roller 2 and the movable roller 3, the photosensor 9 stops outputting the bill detection signals and the bill thickness detection for one bill is completed. The CPU 23 then reads out the bill thickness data stored in the bill thickness data memory 28B of the RAM 28 during the period from the time when the reference pulse No. 10 was output in the rotation cycle T(N) to the time when the reference pulse No. 7 was output in the rotation cycle T(N+1) and reads out reference bill thickness data and the reference number of reference pulses corresponding to the length of the bill which have been stored in the ROM 29 in advance. Then, the CPU 23 compares the bill thickness data and the detected number of reference pulses output during the period that the photosensor 9 output the bill detection signals with the reference bill thickness data and the reference number of the reference pulses, respectively. As a result, in the case where the magnitude of the bill thickness data is about twice that of the reference bill thickness data, even though the detected number of reference pulses substantially agrees with the reference number of reference pulses, or where the detected number of reference pulses is larger than the reference number of reference pulses and the magnitude of the bill thickness data is about twice that of the reference bill thickness data during any part of the period during which the photosensor 9 output the bill detection signals, the CPU 23 judges that double feed of bills has occurred and outputs a double feed detection signal to the display 30 to cause it to display that double feed of bills has occurred. On the other hand, in the case where the detected number of reference pulses substantially agrees with the reference number of reference pulses but the magnitude of the bill thickness data partially exceeds the reference bill thickness data, the CPU 23 judges that a bill counterfeited by use of adhesive tape has been fed and outputs a counterfeited bill detection signal to the display 29 to cause it to display that a counterfeited bill has been fed.

The correction data memory 28B of the RAM 28 is constituted by a ring counter which can store data obtained by one rotation of the reference roller 2 and the movable roller 3 and the stored data can be renewed in synchronism with every rotation of the reference roller 2 and the movable roller 3. Accordingly, even if the positional relationship between the fixed reference shaft 4 and the reference roller 2 mounted thereon and/or the movable shaft 7 and the movable roller 3 mounted thereon is changed in accordance with the elapse of time, detection errors due to such change in the positional relationship can be minimized.

According to the above described embodiment of the present invention, since the amount of displacement of the movable roller 3 detected when no bill is present at the portion where the reference roller 2 and the movable roller 3 face each other are stored as the correction data and the bill thickness is obtained by deducting the correction data from the amount of displacement of the movable roller 3 detected when a bill is present at the portion where the reference roller 2 and the movable roller 3, even if at least one of the reference roller 2 and the movable roller 3 is not manufactured with high accuracy and/or at least one of the reference roller 2 and the movable roller 3 is mounted on the reference shaft 4 or the movable shaft 7 with some eccentricity, the errors caused by these manufacturing and/or mounting errors of the reference roller 2 and the movable roller 3 can be eliminated and the thickness of the bill can be detected with high accuracy, whereby it is possible to detect double feed of bills and bills counterfeited by use of adhesive tape, without fail.

Further, since the reference roller 2 and the movable roller 3 are made rotatable and are rotated by the driving means in synchronism with the bill transporting rate, jamming of bills can be effectively prevented.

Still further, since the correction data stored in the correction data memory 28A are renewed in accordance with the elapse of time, even if the positional relationship between the reference roller 2 and the reference shaft 4 and/or the movable roller 3 and the movable shaft 7 is changed in accordance with the elapse of time, it is possible to detect the thickness of bills with high accuracy, whereby double feed of bills and/or bills counterfeited by use of adhesive tape can be detected without fail.

As described above with respect to the preferred embodiment, according to the present invention, it is possible to provide a sheet thickness detecting apparatus capable of detecting the thickness of sheets with high accuracy while the sheets are prevented from jamming.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, although the detecting arm 12 one end of which is secured to the shaft 10 of the auxiliary roller 11 abutting against the movable roller 3 is mounted on the rotatable shaft 14 of the angle sensor 13 at the other end thereof and the amount of displacement of the movable roller 3 is detected by detecting the amount of change in the rotation of the rotatable shaft 14 of the angle sensor 13 caused by the swing of the detecting arm 12, the amount of displacement of the movable roller 3 may be detected by directly mounting the connecting arm 6 one end of which supports the movable roller 3 rotatably on the rotatable shaft 14 of the angle sensor 13 and detecting an amount of change in the rotation of the rotatable shaft 14 of the angle sensor 13 caused by the swing of the connecting arm 6.

Further, in the above described embodiment, although the bills are transported in such a manner that the surface thereof is substantially vertical and the connecting arm 6 and the detecting arm 12 are biased toward the reference roller 2 and the movable roller 3 by the compression springs 8 and 15 respectively, it is possible for the movable roller 3 and the auxiliary roller 11 to be made abuttable against the reference roller 2 and the movable roller 3 by the force of gravity by transporting the bills in such a manner that the surface thereof is substantially horizontal and disposing the reference roller 2 below the bill transporting path 1 and the movable roller 3 above the bill transporting path 1. In this case, it is of course possible to further provide biasing means such as springs to bias the connecting arm 6 and the detecting arm 12 against the reference roller 2 and the movable roller 3, respectively.

Still further, in the above described embodiment, although the transporting rollers, the belts, the reference roller 2 and the movable roller 3 are driven by the common driving means, one or more of them may be driven by a different driving means and each of them may be driven by different driving means.

Moreover, in the above described embodiment, although double feed of bills and bills counterfeited by use of adhesive tape are detected by comparing the bill thickness data and the detected number of reference pulses with the reference bill thickness data and the reference number of reference pulses, respectively, it is possible to compare only the bill thickness data and the reference bill thickness data, whereby if the magnitude of the bill thickness data is about twice that of the reference bill thickness data, it is judged that double feed of bills has occurred and if bill thickness data the magnitude of which is larger than that of the reference bill thickness data are detected over more than the predetermined number of reference pulses, it is judged that bills counterfeited by use of adhesive tape has been fed.

Further, in the above described embodiment, the diameter of the reference roller 2 and the movable roller 3 is determined to be same and their rotation cycles accord with each other, whereby the detection of the amount of displacement of the movable roller 3 is conducted in the same cycle as the rotation cycle of the reference roller 2 and the movable roller 3. However, it is not necessarily required that the reference roller 2 and the movable roller 3 be of the same diameter and rotation cycle. More specifically, even if the diameter and rotation cycle of one of the rollers are smaller than those of the other and the ratio in their diameter and their rotation cycles is 1/L wherein L is larger than 1, since the positional relationship between the reference roller 2 and the movable roller 3 necessarily becomes identical each time the one of the rollers having the smaller diameter and rotation cycle rotates by a number of times corresponding to the least common multiple of L and 1, if it is assumed that the positional relationship between the reference roller 2 and the reference shaft 4, and the movable roller 3 and the movable shaft 7 is not changed, the amount of displacement of the movable roller 3 can be detected with the same errors caused by the manufacturing errors and/or the mounting errors of at least one of the reference roller 2 and the movable roller 3 in a cycle corresponding to the period required for that one of the rollers having the smaller diameter and rotation cycle to rotate by the number of times equal to the least common multiple of L and 1. Therefore, if the detection of the amount of displacement of the movable roller 3 is carried out in accordance with a cycle corresponding to the period required for that one of the rollers having the smaller diameter and rotation cycle to rotate by the number of times equal to the least common multiple of L and 1, it is possible to detect the thickness of bills with high accuracy by deducting the correction data read and stored in the correction data memory 28A when the photosensor 9 did not output the bill detection signals and the reference pulse having the same number was output from the reference pulse generating photosensor 24 in the last cycle from the displacement data of the movable roller 3 detected when the photosensor 9 output the bill detection signals. However, in the case where the least common multiple of L and 1 is too large, since the cycle for detecting the amount of displacement of the movable roller 3 becomes larger and the amount of the correction data to be stored in the correction data memory 28A inevitably increases, it is necessary to employ a memory means having large capacity as the correction data memory 28A, which is not preferable. Accordingly, the smaller the least common multiple of L and 1 is, the more preferable it is, and it is usually preferable that the least common multiple be not more than 10 and it is most preferable that it is equal to 1, in other words, that the diameter of the reference roller 2 and the movable roller 3 be the same.

Moreover, in the above described embodiment, although a ring counter is used for the correction data memory 28A, any memory means can be used insofar as it can store the data detected during the rotation cycle of the one of the reference roller 2 and the movable roller 3 with the longer rotation cycle and renew them in accordance with the elapse of time.

Still further, in the above described embodiment, although an apparatus for detecting the thickness of bills is described, it is apparent that the present invention can be applied to an apparatus for detecting the thickness of various kinds of sheets other than bills.

Further, it should be noted that each means defined in the appended claims does not necessarily mean physical means and that cases where the function of each means can be accomplished by software fall within the scope of the present invention. For example, the function of one means defined in the appended claims may be accomplished by two or more physical means and two or more means defined in the appended claims may be accomplished by one physical means in the present invention.

What is claimed is:

1. An apparatus for detecting the thickness of sheets by detecting displacement of one of a pair of rollers disposed so as to face each other across a transporting path of the sheets, said pair of rollers being driven by driving means, said pair of the rollers essentially consisting of a reference roller rotatable about a fixed shaft and a movable roller abuttable against said reference roller and rotatably mounted on a movable shaft displaceable with respect to said reference roller, said apparatus comprising timing signal generating means for generating timing signals synchronized with rotation of said reference roller and said movable roller, displacement detecting means for detecting an amount of displacement of said movable roller by detecting an amount of displacement of said movable shaft in synchronism with said timing signals, sheet detecting means for detecting whether or not the sheets are present at a portion where said reference roller and said movable roller face each other, sheet thickness calculating means for calculating the thickness of the sheet by deducting, in accordance with the timing signals, the amount of displacement of said movable roller detected by said displacement detecting means when said sheet detecting means do not detect any sheet at the portion where said reference roller and said movable roller face each other from the amount of displacement of said movable roller detecting by said displacement detecting means when said sheet detecting means detect the sheet at the portion where said reference roller and said movable roller face each other, a ratio of the diameter of the reference roller and the movable roller is M, wherein M is not less than 1, and the least common multiple between M and 1 is not more than 10, and correction data memory means for storing the amount of displacement of the movable roller detected when said sheet detecting means do not detect any sheet at the portion where the reference roller and the movable roller face each other as correction data, deducting means for deducting said correction data stored in said correction data memory means when a corresponding timing signal was output in the last cycle, a cycle being defined as the rotation cycle of the one of the reference roller and the movable roller which has a diameter not less than that of the other, from the amount of displacement of the movable roller detected when said sheet detecting means detect at least one sheet at the portion where the reference roller and the movable roller face each other to obtain the sheet thickness data, sheet thickness data memory means for storing said sheet thickness data, and sheet thickness calculating means for calculating the thickness of the sheet based upon said sheet thickness data stored in the sheet thickness data memory means.

2. An apparatus for detecting the thickness of sheets in accordance with claim 1, which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

3. An apparatus for detecting the thickness of sheets in accordance with claim 1, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

4. An apparatus for detecting the thickness of sheets by detecting displacement of one of a pair of rollers disposed so as to face each other across a transporting path of the sheets, said pair of rollers being driven by driving means, said pair of the rollers essentially consisting of a reference roller rotatable about a fixed shaft and a movable roller abuttable against said reference roller and rotatably mounted on a movable shaft displaceable with respect to said reference roller, said apparatus comprising timing signal generating means for generating timing signals synchronized with rotation of said reference roller and said movable roller, displacement detecting means for detecting an amount of displacement of said movable roller by detecting an amount of displacement of said movable shaft in synchronism with said timing signals, sheet detecting means for detecting whether or not the sheets are present at a portion where said reference roller and said movable roller face each other, sheet thickness calculating means for calculating the thickness of the sheet by deducting, in accordance with the timing signals, the amount of displacement of said movable roller detected by said displacement detecting means when said sheet detecting means do not detect any sheet at the portion where said reference roller and said movable roller face each other from the amount of displacement of said movable roller detecting by said displacement detecting means when said sheet detecting means detect the sheet at the portion where said reference roller and said movable roller face each other, correction data memory means for storing the amount of displacement of the movable roller detected when said sheet detecting means do not detect any sheet at the portion where the reference roller and the movable roller face each other as correction data, deducting means for deducting said correction data stored in said correction data memory means when a corresponding timing signal was output in the last cycle, a cycle being defined as the rotation cycle of the one of the reference roller and the movable roller which has a diameter not less than that of the other, from the amount of displacement of the movable roller detected when said sheet detecting means detect at least one sheet at the portion where the reference roller and the movable roller face each other to obtain the sheet thickness data, sheet thickness data memory means for storing said sheet thickness data, and sheet thickness calculating means for calculating the thickness of the sheet based upon said sheet thickness data stored in the sheet thickness data memory means.

5. An apparatus for detecting the thickness of sheets in accordance with claim 4, wherein a ratio of the diameter of the reference roller and the movable roller is M, wherein M is not less than 1, and the least common multiple between M and 1 is not more than 10.

6. An apparatus for detecting the thickness of sheets in accordance with claim 5, which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

7. An apparatus for detecting the thickness of sheets in accordance with claim 5, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

8. An apparatus for detecting the thickness of sheets in accordance with claim 4, wherein a ratio of the diameter of the movable roller and the reference roller is M, wherein M is not less than 1, and the least common multiple between M and 1 is not more than 10.

9. An apparatus for detecting the thickness of sheets in accordance with claim 8, which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

10. An apparatus for detecting the thickness of sheets in accordance with claim 8, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

11. An apparatus for detecting the thickness of sheets in accordance with claim 4, wherein the diameters of the reference roller and the movable roller are the same.

12. An apparatus for detecting the thickness of sheets in accordance with claim 11, which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

13. An apparatus for detecting the thickness of sheets in accordance with claim 11, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

14. An apparatus for detecting the thickness of sheets in accordance with claim 4 which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

15. An apparatus for detecting the thickness of sheets in accordance with claim 14, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

16. An apparatus for detecting the thickness of sheets in accordance with claim 4 which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

17. An apparatus for detecting the thickness of sheets by detecting displacement of one of a pair of rollers disposed so as to face each other across a transporting path of the sheets, said pair of rollers being driven by driving means, said pair of the rollers essentially consisting of a reference roller rotatable about a fixed shaft and a movable roller abuttable against said reference roller and rotatably mounted on a movable shaft displaceable with respect to said reference roller, said apparatus comprising timing signal generating means for generating timing signals synchronized with rotation of said reference roller and said movable roller, displacement detecting means for detecting an amount of displacement of said movable roller by detecting an amount of displacement of said movable shaft in synchronism with said timing signals, sheet detecting means for detecting whether or not the sheets are present at a portion where said reference roller and said movable roller face each other, sheet thickness calculating means for calculating the thickness of the sheet by deducting, in accordance with the timing signals, the amount of displacement of said movable roller detected by said displacement detecting means when said sheet detecting means do not detect any sheet at the portion where said reference roller and said movable roller face each other from the amount of displacement of said movable roller detected by said displacement detecting means when said sheet detecting means detect the sheet at the portion where said reference roller and said movable roller face each other, a ratio of the diameter of the movable roller and the reference roller is M, wherein M is not less than 1, and the least common multiple between M and 1 is not more than 10, correction data memory means for storing the amount of displacement of the movable roller detected when said sheet detecting means do not detect any sheet at the portion where the reference roller and the movable roller face each other as correction data, deducting means for deducting said correction data stored in said correction data memory means when a corresponding timing signal was output in the last cycle, a cycle being defined at the rotation cycle of the one of the reference roller and the movable roller which has a diameter not less than that of the other, from the amount of displacement of the movable roller detected when said sheet detecting means detect at least one sheet at the portion where the reference roller and the movable roller face each other to obtain the sheet thickness data, sheet thickness data memory means for storing said sheet thickness data, and sheet thickness calculating means for calculating the thickness of the sheet based upon said sheet thickness data stored in the sheet thickness data memory means.

18. An apparatus for detecting the thickness of sheets in accordance with claim 17, which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

19. An apparatus for detecting the thickness of sheets in accordance with claim 17, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

20. An apparatus for detecting the thickness of sheets by detecting displacement of one of a pair of rollers disposed so as to face each other across a transporting path of the sheets, said pair of rollers being driven by driving means, said pair of the rollers essentially consisting of a reference roller rotatable about a fixed shaft and a movable roller abuttable against said reference roller and rotatably mounted on a movable shaft displaceable with respect to said reference roller, said apparatus comprising timing signal generating means for generating timing signals synchronized with rotation of said reference roller and said movable roller, displacement detecting means for detecting an amount of displacement of said movable roller by detecting an amount of displacement of said movable shaft in synchronism with said timing signals, sheet detecting means for detecting whether or not the sheets are present at a portion where said reference roller and said movable roller face each other, sheet thickness calculating means for calculating the thickness of the sheet by deducting, in accordance with the timing signals, the amount of displacement of said movable roller detected by said displacement detecting means when said sheet detecting means do not detect any sheet at the portion where said reference roller and said movable roller face each other from the amount of displacement of said movable roller detected by said displacement detecting means when said sheet detecting means detect the sheet at the portion where said reference roller and said movable roller face each other, the diameters of the reference roller and the movable roller are the same, correction data memory means for storing the amount of displacement of the movable roller detected when said sheet detecting means to not detect any sheet at the portion where the reference roller and the movable roller face each other as correction data, deducting means for deducting said correction data stored in said correction data memory means when a corresponding timing signal was output in the last cycle, a cycle being defined at the rotation cycle of the one of the reference roller and the movable roller which has a diameter not less than that of the other, from the amount of displacement of the movable roller detected when said sheet detecting means detect at least one sheet at the portion where the reference roller and the movable roller face each other to obtain the sheet thickness data, sheet thickness data memory means for storing said sheet thickness data, and sheet thickness calculating means for calculating the thickness of the sheet based upon said sheet thickness data stored in the sheet thickness data memory means.

21. An apparatus for detecting the thickness of sheets in accordance with claim 20, which further includes a swingable member swingable about a rotatable shaft in accordance with the displacement of said movable shaft of said movable roller with respect to said reference roller and wherein the amount of displacement of the movable roller is detected by detecting the rotation of said rotatable shaft by said displacement detecting means.

22. An apparatus for detecting the thickness of sheets in accordance with claim 20, which further includes reference thickness memory means for storing the reference thickness of the sheet, comparing means for comparing said thickness of the sheet calculated by said sheet thickness calculating means with said reference thickness of the sheet stored in said reference thickness memory means, and display means for displaying the results obtained by said comparing means.

* * * * *